(12) United States Patent
Shubin et al.

(10) Patent No.: US 8,971,674 B2
(45) Date of Patent: Mar. 3, 2015

(54) OPTICAL DEVICE WITH HIGH THERMAL TUNING EFFICIENCY

(75) Inventors: Ivan Shubin, San Diego, CA (US); John E. Cunningham, San Diego, CA (US); Xuezhe Zheng, San Diego, CA (US); Guoliang Li, San Diego, CA (US); Ashok V. Krishnamoorthy, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 599 days.

(21) Appl. No.: 12/730,774

(22) Filed: Mar. 24, 2010

(65) Prior Publication Data
US 2011/0235962 A1    Sep. 29, 2011

(51) Int. Cl.
| | |
|---|---|
| G02B 6/12 | (2006.01) |
| H01L 21/02 | (2006.01) |
| G02F 1/025 | (2006.01) |
| G02F 1/313 | (2006.01) |
| G02F 1/01 | (2006.01) |

(52) U.S. Cl.
CPC ............ G02B 6/12007 (2013.01); G02F 1/025 (2013.01); G02F 1/3132 (2013.01); G02F 1/0147 (2013.01)
USPC .............................................. 385/14; 438/31

(58) Field of Classification Search
None
See application file for complete search history.

(56) References Cited

U.S. PATENT DOCUMENTS

2010/0111461 A1*  5/2010  Takahashi et al. ................. 385/1

FOREIGN PATENT DOCUMENTS

WO    WO 2008111407 A1 *  9/2008

* cited by examiner

*Primary Examiner* — Sarah Hahm
(74) *Attorney, Agent, or Firm* — Park, Vaughan, Fleming & Dowler LLP; Steven E. Stupp

(57) ABSTRACT

An optical device with high thermal tuning efficiency is described. This optical device may be implemented using a tri-layer structure (silicon-on-insulator technology), including: a substrate, a buried-oxide layer and a semiconductor layer. In particular, a thermally tunable optical waveguide may be defined in the semiconductor layer. Furthermore, a portion of the substrate under the buried-oxide layer and substantially beneath a location of the thermally tunable optical waveguide is fabricated so that a portion of the buried-oxide layer is exposed. In this way, the thermal impedance between the thermally tunable optical waveguide and an external environment is increased, and power consumption associated with thermal tuning of the optical waveguide is reduced.

18 Claims, 9 Drawing Sheets

```
┌─────────────────────────────────────────────────────────┐
│  DEFINE A THERMALLY TUNABLE OPTICAL WAVEGUIDE IN A       │
│  SEMICONDUCTOR LAYER IN AT LEAST A TRI-LAYER STRUCTURE   │
│  THAT INCLUDES A SUBSTRATE, A BURIED-OXIDE LAYER         │
│  DISPOSED ON THE SUBSTRATE, AND THE SEMICONDUCTOR        │
│  LAYER DISPOSED ON THE BURIED-OXIDE LAYER                │
│                        910                               │
└─────────────────────────────────────────────────────────┘
                            │
                            ▼
┌─────────────────────────────────────────────────────────┐
│  REMOVE A PORTION OF THE SUBSTRATE UNDER THE BURIED-     │
│  OXIDE LAYER AND SUBSTANTIALLY BENEATH A LOCATION OF     │
│  THE THERMALLY TUNABLE OPTICAL WAVEGUIDE SO THAT A       │
│  PORTION OF THE BURIED-OXIDE LAYER IS EXPOSED, THEREBY   │
│  INCREASING A THERMAL IMPEDANCE BETWEEN THE THERMALLY    │
│  TUNABLE OPTICAL WAVEGUIDE AND AN EXTERNAL               │
│  ENVIRONMENT, AND REDUCING POWER CONSUMPTION             │
│  ASSOCIATED WITH THERMAL TUNING OF THE OPTICAL WAVEGUIDE │
│                        912                               │
└─────────────────────────────────────────────────────────┘
```

OPTICAL DEVICE WITH HIGH THERMAL TUNING EFFICIENCY

GOVERNMENT LICENSE RIGHTS

This invention was made with Government support under Agreement No. HR0011-08-9-0001 awarded by DARPA. The Government has certain rights in the invention.

BACKGROUND

1. Field

The present disclosure relates to techniques for communicating optical signals. More specifically, the present disclosure relates to an optical device with a high thermal tuning efficiency.

2. Related Art

Wavelength division multiplexing (WDM) is widely used to communicate modulated data at different carrier wavelengths on a common optical waveguide. WDM can overcome optical-fiber congestion, which is a potential problem in optical modules that include parallel optical transceivers with one channel per optical fiber. In particular, by significantly reducing the number of optical fibers per optical module, WDM multiplexing can simplify optical modules, thereby reducing their cost and size.

In dense WDM (DWDM), a narrow spacing between adjacent wavelengths is used. This is typically achieved by modulating data directly onto a highly stable optical carrier, and then combining multiple carriers in an optical fiber. DWDM allows a large number of channels to be accommodated within a given wavelength band, and thus offers high performance.

In DWDM, a variety of optical devices are used as: modulators, multiplexers (such as add filters), de-multiplexers (such as drop filters), filters and switches. In order to compensate for fabrication variation, temperature variation and/or laser wavelength drift, these optical devices are typically phase-tuned to a particular wavelength for a given channel. Depending on the system requirements, a tuning range of at least 180° may be needed.

Thermal tuning is a popular tuning technique because it provides the ability to produce large phase shifts. Existing thermal tuning techniques include direct heating (which is implemented by doping in an optical waveguide) and indirect heating (in which a heater is proximate to the optical waveguide). Typically, the direct-heating technique is more energy-efficient than indirect heating, but it can prevent the optical waveguide from performing additional functions (because of the constraint on the doping density), and it can introduce additional optical losses due to free-carrier absorption (which can degrade the quality factor of an optical resonator).

In principle, optical devices can be made on silicon substrates, because silicon provides many benefits for optical communication. For example, the high index-of-refraction contrast between silicon and silicon dioxide can be used to create sub-micron waveguides to confine light with spatial densities that are up to 100× larger than in a single-mode optical fiber. Furthermore, by using a silicon-on-insulator (SOI) technology, a silicon waveguide can be surrounded by silicon dioxide on all four sides, which facilitates low-loss, on-chip waveguides and active devices (such as detectors and modulators). Silicon-based optical devices can be used to implement a wide variety of optical components for use in WDM communication. These silicon-based optical devices offer numerous advantages, including: miniaturization, low-energy modulation, the ability to integrate with other devices in silicon, and/or the ability to leverage the large, existing silicon manufacturing infrastructure.

Unfortunately, there are problems associated with silicon-based optical devices. A notable problem is the high thermal conductivity of silicon. While this helps remove the heat dissipated by electrical circuits, it can make it more difficult to thermally tune a silicon-based optical device. In particular, because the operating wavelength of a silicon-based optical device (such as the resonant wavelength of an optical resonator) strongly depends on temperature, the operating wavelength is typically tuned using either direct or indirect heating to change the operating temperature of the silicon-based optical device. However, the high thermal conductivity of silicon results in excessive thermal coupling to the surrounding environment. Consequently, thermal tuning of silicon-based optical devices often consumes a disproportionately large amount of energy (typically, 50-100 mW for a phase shift of 180°). This high power consumption can offset the advantages provided by silicon, and makes it more difficult to use silicon-based optical devices to implement optical communication (such as WDM) in computing systems (especially in systems that have multiple instances of the optical devices).

Hence, what is needed is an optical device that can be thermally tuned without the above-described problems.

SUMMARY

One embodiment of the present disclosure provides an optical device that includes: a substrate, a buried-oxide layer disposed on the substrate, and a semiconductor layer, disposed on the buried-oxide layer, which includes a thermally tunable optical waveguide. A portion of the substrate under the buried-oxide layer and substantially beneath a location of the thermally tunable optical waveguide is fabricated so that a portion of the buried-oxide layer is exposed, thereby increasing a thermal impedance between the thermally tunable optical waveguide and an external environment, and reducing power consumption associated with thermal tuning of the optical waveguide.

Note that the substrate may include silicon, the buried-oxide layer may include a dielectric (such as a silicon oxide), and the semiconductor layer may include silicon. Therefore, the substrate, the buried-oxide layer and the semiconductor layer may constitute a silicon-on-insulator technology. Furthermore, the portion of the substrate may have been removed using an etch technique in which the buried-oxide layer functioned as an etch stop.

In some embodiments, the optical device includes a heater, defined on or near the semiconductor layer, which is in or proximate to the optical waveguide, and which is used to thermally tune the optical waveguide. For example, the heater may include a passive resistor or an active device.

This optical waveguide may be included in a variety of optical components, including: an optical modulator, an optical filter, an optical multiplexer, an optical de-multiplexer and/or an add/drop device.

In some embodiments, the optical device includes multiple instances of a thermally tunable optical waveguide. For example, the semiconductor layer may include a second thermally tunable optical waveguide. Moreover, a second portion of the substrate under the buried-oxide layer and substantially beneath a location of the second thermally tunable optical waveguide may be absent so that a second portion of the buried-oxide layer is exposed.

Furthermore, note that the first portion of the substrate and the second portion of the substrate may be thermally coupled or may be thermally decoupled. For example, the first portion of the substrate and the second portion of the substrate may be separated by a horizontal region in which the substrate under the buried-oxide layer remains, thereby, at least in part, thermally isolating the thermally tunable optical waveguide from the second thermally tunable optical waveguide. Alternatively, the portion of the substrate under the buried-oxide layer that is absent is also substantially beneath a location of the second thermally tunable optical waveguide (i.e., the first portion of the substrate may include the second portion of the substrate), so that the first thermally tunable optical waveguide and the second thermally tunable optical waveguide are thermally coupled.

Another embodiment provides a system (such as a computer system) that includes the optical device.

Another embodiment provides a method for fabricating an optical device. During this method, a thermally tunable optical waveguide is defined in a semiconductor layer in at least a tri-layer structure that includes a substrate, a buried-oxide layer disposed on the substrate, and the semiconductor layer disposed on the buried-oxide layer. Then, a portion of the substrate under the buried-oxide layer and substantially beneath a location of the thermally tunable optical waveguide is removed so that a portion of the buried-oxide layer is exposed, thereby increasing a thermal impedance between the thermally tunable optical waveguide and an external environment, and reducing power consumption associated with thermal tuning of the optical waveguide.

BRIEF DESCRIPTION OF THE FIGURES

FIG. 9 is a flow chart illustrating a process for fabricating an optical device in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of an optical device, a system that includes the optical device, and a technique for fabricating the optical device are described. This optical device may be implemented using a tri-layer structure (silicon-on-insulator technology), including: a substrate, a buried-oxide layer and a semiconductor layer. In particular, a thermally tunable optical waveguide may be defined in the semiconductor layer. Furthermore, a portion of the substrate under the buried-oxide layer and substantially beneath a location of the thermally tunable optical waveguide is absent so that a portion of the buried-oxide layer is exposed. In this way, the thermal impedance between the thermally tunable optical waveguide and an external environment is increased, and power consumption associated with thermal tuning of the optical waveguide is reduced.

By reducing the thermal coupling between the optical waveguide and the external environment, the optical device can be thermally tuned with significantly less power consumption than existing silicon-based optical devices (for example, 10-100× less power consumption). This reduction in power consumption may facilitate systems that use DWDM with a channel spacing of approximately 50 GHz, as well as high-performance computing systems that include optical interconnects. Moreover, in these systems the optical device may: reduce the number of components, reduce the cost, and/or increase reliability.

We now describe embodiments of an optical device that includes an optical waveguide. Thermal tuning of an optical waveguide, which is implemented on silicon, is often based on the increase in the index of refraction of silicon with temperature. By changing the temperature in the optical waveguide, the index of refraction, as well as the optical phase (which is proportional to the index of refraction) of the propagating laser light in the optical waveguide, can be tuned. In order to achieve efficient thermal tuning, the temperature change in the optical waveguide needs to be maximized for the available heater power.

Figure 1:
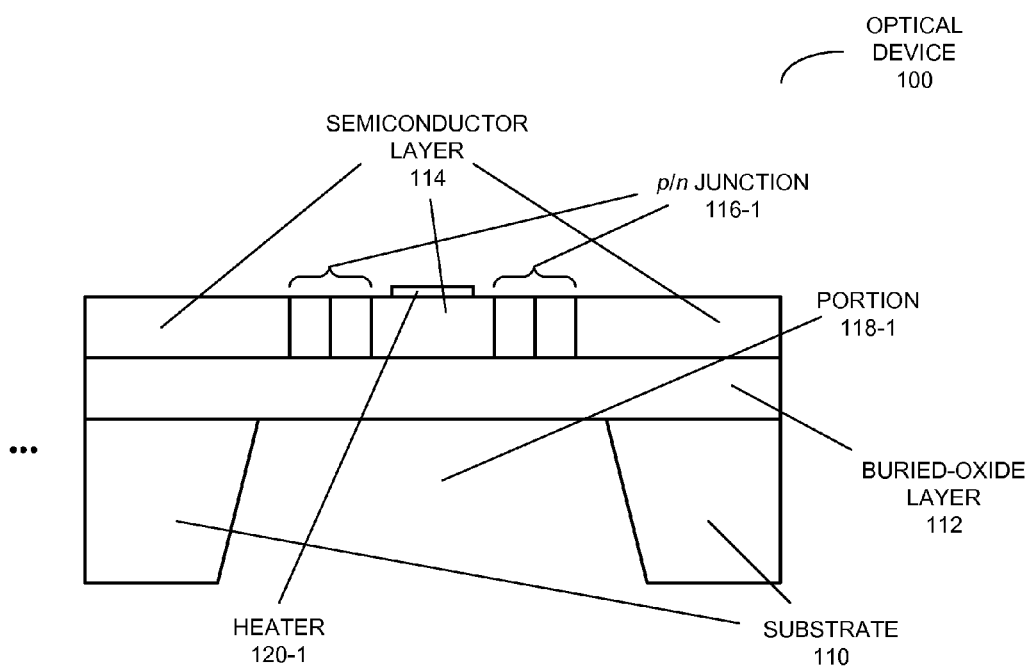
FIG. 1 is a block diagram illustrating a cross-sectional view of a tunable optical device in accordance with an embodiment of the present disclosure.
Figure 2:
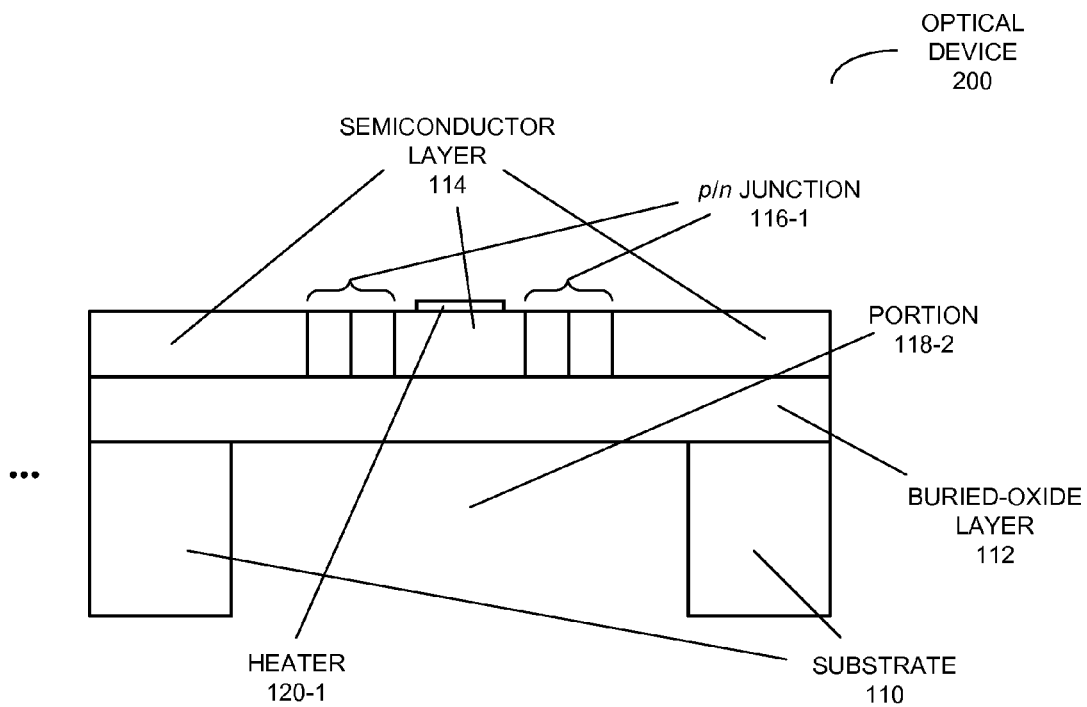
FIG. 2 is a block diagram illustrating a cross-sectional view of a tunable optical device in accordance with an embodiment of the present disclosure.

FIG. 1 presents a block diagram illustrating a cross-sectional view of a highly efficient tunable optical device 100. This optical device includes: a substrate 110, a buried-oxide layer 112 disposed on the substrate 110, and a semiconductor layer 114 disposed on the buried-oxide layer 112. This semiconductor layer includes a thermally tunable resonant optical waveguide, as illustrated by p/n junction 116-1. (As shown in FIG. 2, the optical waveguide may be implemented in a ring-modulator or resonator configuration, so the two portions of p/n junction 116-1 shown in FIG. 1 are actually part of one continuous structure.) A resonant wavelength of this optical waveguide is a function of the temperature of p/n junction 116-1. This optical waveguide may be included in a variety of optical components, such as: an optical modulator, an optical filter, an optical multiplexer, an optical de-multiplexer and an add/drop device.

In optical device 100, a portion 118-1 of substrate 110 under buried-oxide layer 112 and substantially beneath a location of the thermally tunable optical waveguide has been removed (i.e., is absent) so that a portion of buried-oxide layer 112 is exposed. (For example, portion 118-1 may encompass some or all of the area defined by a radial circumference of the optical waveguide.) Because air has a much lower thermal conductivity (approximately 0.02 W/m-K) compared to a substrate such as silicon (130 W/m-K), by removing portion 118-1 of substrate 110, the thermal impedance between the thermally tunable optical waveguide and an external environment is significantly increased (by up to 100×), which allows a greater temperature difference to be applied and maintained between the optical waveguide and the external environment. If a heater 120-1 (such as a passive resistor or an active device) that is used to thermally tune the optical waveguide is implemented in, or is disposed on or proximate to the thermally tunable optical waveguide, there is a low thermal impedance to the optical waveguide. Therefore, in conjunction with the increased thermal impedance to the external environment, the power consumption associated with thermal tuning of the optical waveguide is reduced. For example, power consumption by the heater may be less than 10 mW for a 180° phase shift in the optical waveguide (which is at least 10× lower than existing optical devices). This highly efficient thermal tuning capability may allow the resonant wavelength of the optical waveguide to be adjusted or selected to address fabrication variations and imperfections, and/or to reconfigure one or more components in a system (such as system 800 in FIG. 8).

In an exemplary embodiment, substrate 110 includes silicon, buried-oxide layer 112 includes a dielectric or an oxide (such as silicon dioxide), and/or semiconductor layer 114 includes silicon. Therefore, substrate 110, buried-oxide layer 112 and semiconductor layer 114 may constitute a silicon-on-insulator (SOI) technology. Furthermore, the silicon in semiconductor layer 114 may be 0.5 μm thick, and the silicon-dioxide layer may have a thickness between 0.001 and 10 μm.

A wide variety of process techniques may be used to remove portion 118-1 from the backside of substrate 110. For example, using a chemical etch process, portion 118-1 of substrate 110 may be removed, thereby effectively eliminating a heat sink from the immediate proximity of the optical waveguide. This chemical etch process may be based on either wet or dry chemistry in which buried-oxide layer 112 functions as an etch stop. (Thus, both the dry and wet etch processes may be optimized to react with high selectivity to the silicon in substrate 110, while leaving silicon dioxide in buried-oxide layer 112 intact.) Note that a backside wet etch process may be based on hydroxides (such as KOH, TMAH, etc.), while a dry etch process may use one or more fluorine gases (such as $CF_4$, $CHF_3$, $SF_6$, etc.). (However, these techniques may be combined and/or supplemented with one or more other chemical processes.) Moreover, careful alignment may not be needed when removing portion 118-1. In addition, with adequate front-side component protection, the optical waveguide and associated circuitry may be unaffected by the backside processing and, thus, their performance may not be adversely impacted.

Note that buried-oxide layer 112 may be thermally grown on substrate 110 without any residual intrinsic stress. Once portion 118-1 of substrate 110 is removed, the thermally tuned optical waveguide is supported by this stress-free layer, and buried-oxide layer 112 is supported by the remainder of substrate 110 where thermal isolation is not needed. Thus, the undercut, thermally isolated and suspended optical waveguide may remain mechanically supported and stable.

While FIG. 1 illustrates an angled wall adjacent to portion 118-1 (such as a wall angle of 54.7°), which is associated with a wet etch process, in other embodiments the removed portion of substrate 110 may have a higher aspect ratio (such as an approximately 90° wall angle), which may be associated with an anisotropic dry etch process. This is shown in FIG. 2, which presents a block diagram illustrating a cross-sectional view of a tunable optical device 200, including portion 118-2 that has been removed from substrate 110.

Figure 3A:
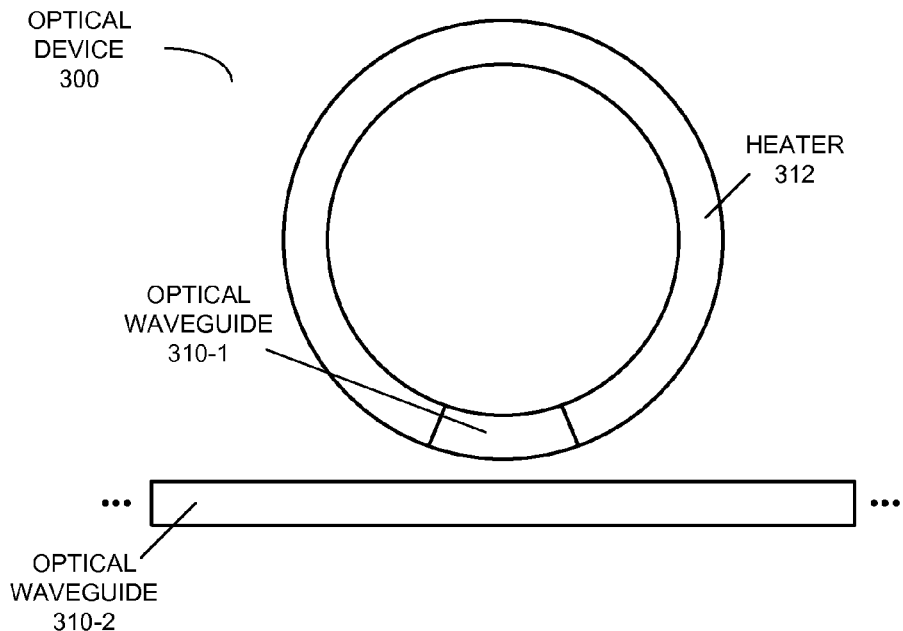
FIG. 3A is a block diagram illustrating a top view of a tunable optical device in accordance with an embodiment of the present disclosure.
Figure 3B:
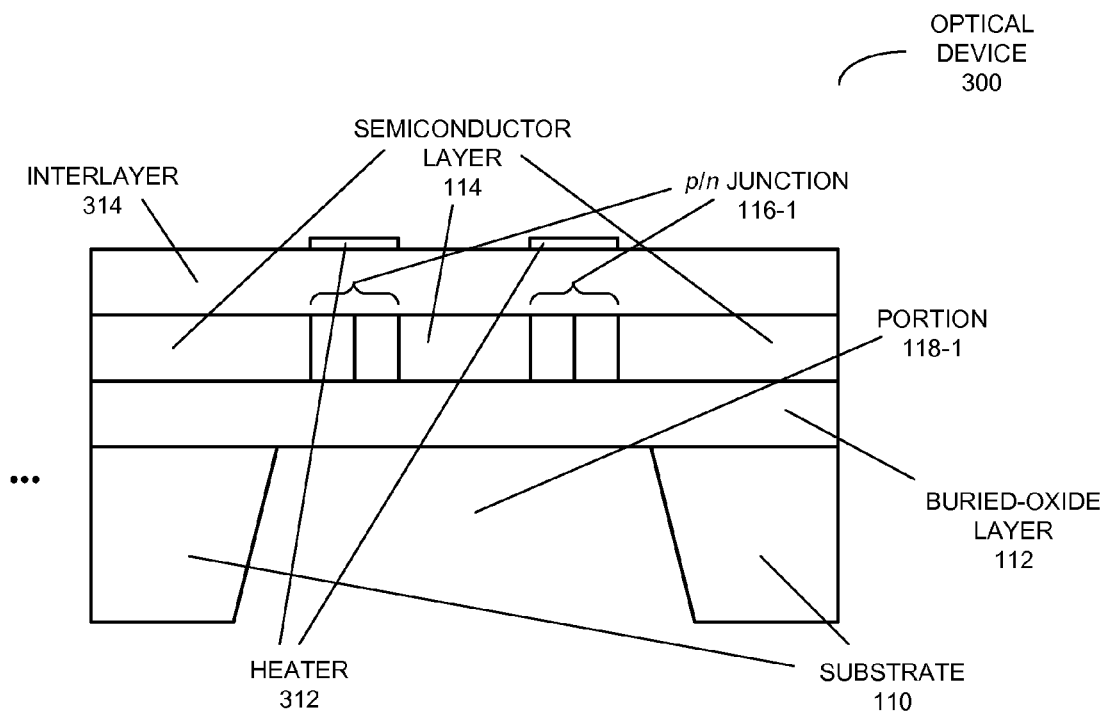
FIG. 3B is a block diagram illustrating a cross-sectional view of the tunable optical device in FIG. 3A in accordance with an embodiment of the present disclosure.

A variety of configurations may be used to implement heater 120-1 (and, more generally, a heating element). In one type of configuration, an 'overclad' heater (such as a metal strip), separated by an interlayer dielectric, is placed above a silicon ring waveguide. This is shown in FIGS. 3A and 3B, which present block diagrams illustrating a top view and a cross-sectional view, respectively, of a tunable optical device 300 that includes optical waveguides 310, including a ring resonator optical waveguide 310-1 and a bus waveguide 310-2. In this embodiment, heat associated with a DC or AC current from a tuning circuit in heater 312 (which is separated from semiconductor layer 114 by interlayer 314) heats up optical waveguide 310-1.

Figure 4A:
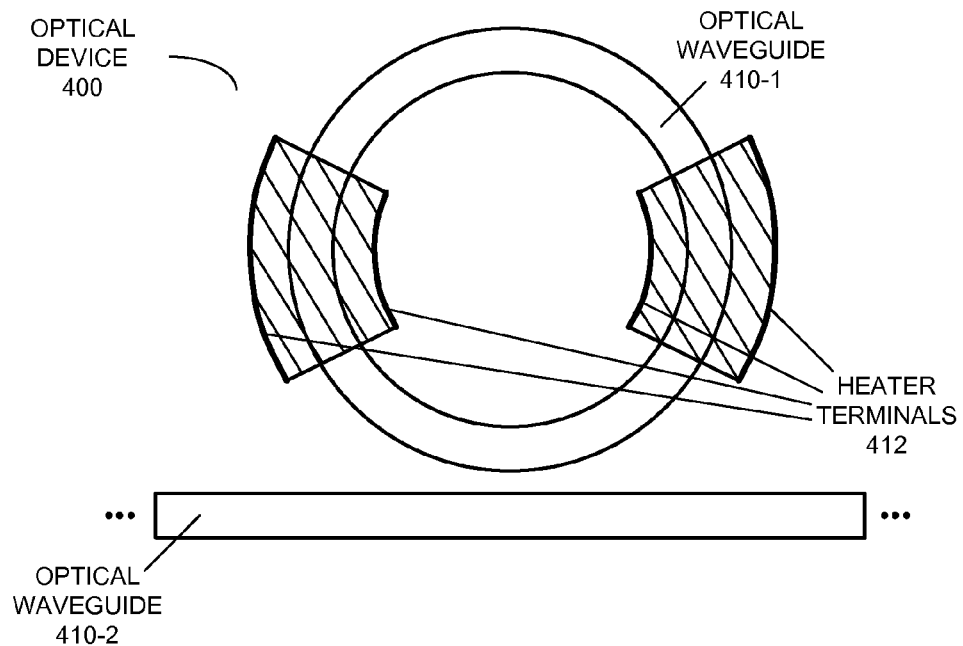
FIG. 4A is a block diagram illustrating a top view of a tunable optical device in accordance with an embodiment of the present disclosure.
Figure 4B:
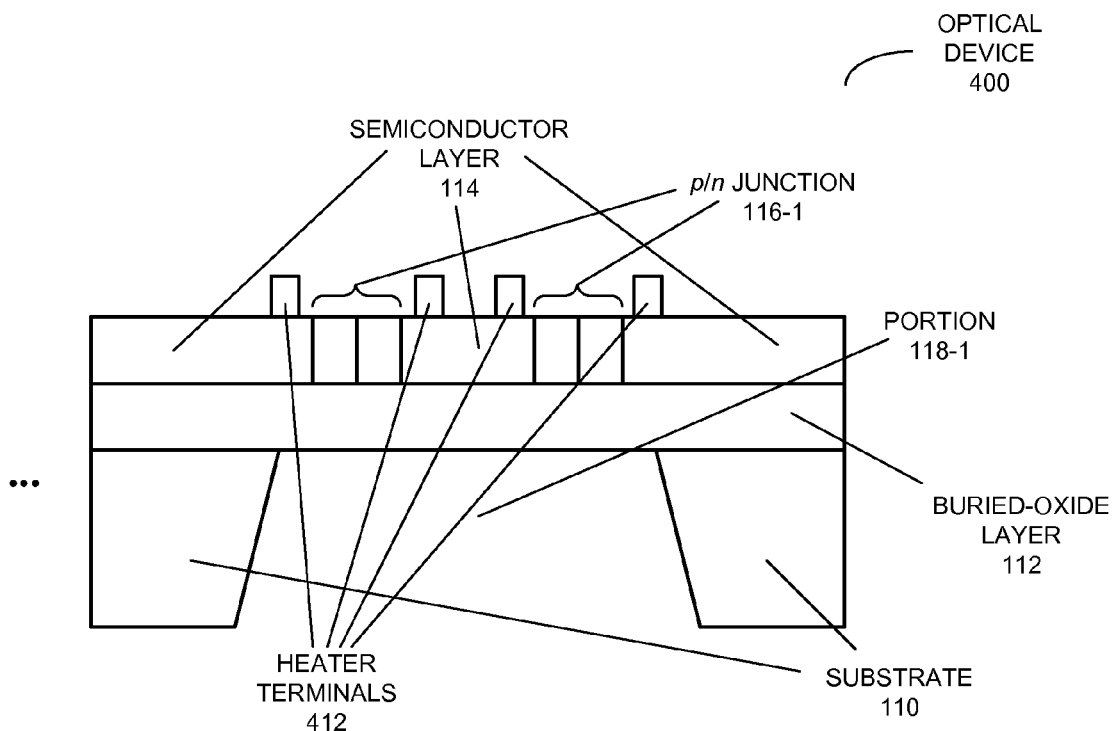
FIG. 4B is a block diagram illustrating a cross-sectional view of the tunable optical device in FIG. 4A in accordance with an embodiment of the present disclosure.
Figure 5A:
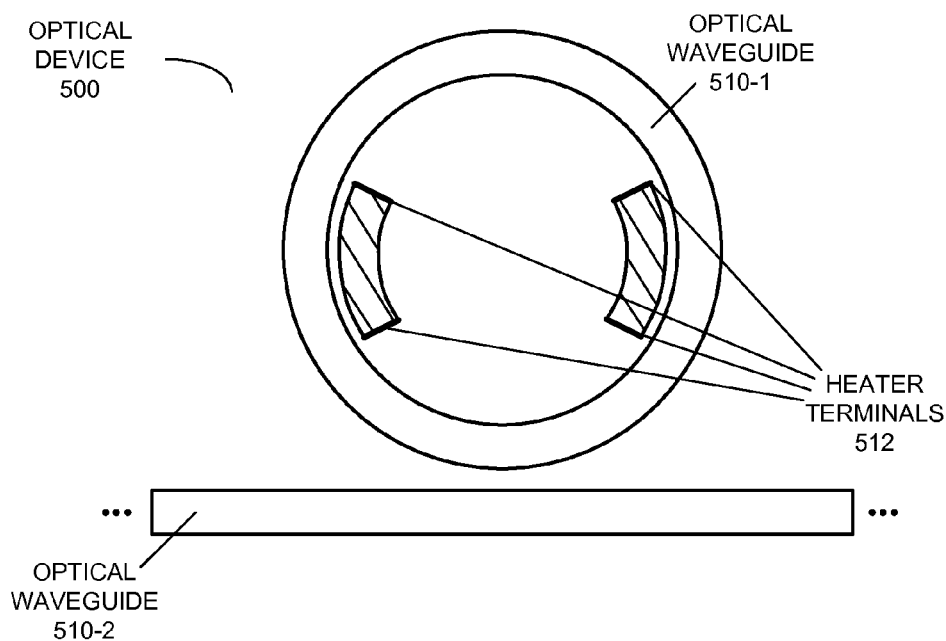
FIG. 5A is a block diagram illustrating a top view of a tunable optical device in accordance with an embodiment of the present disclosure.
Figure 5B:
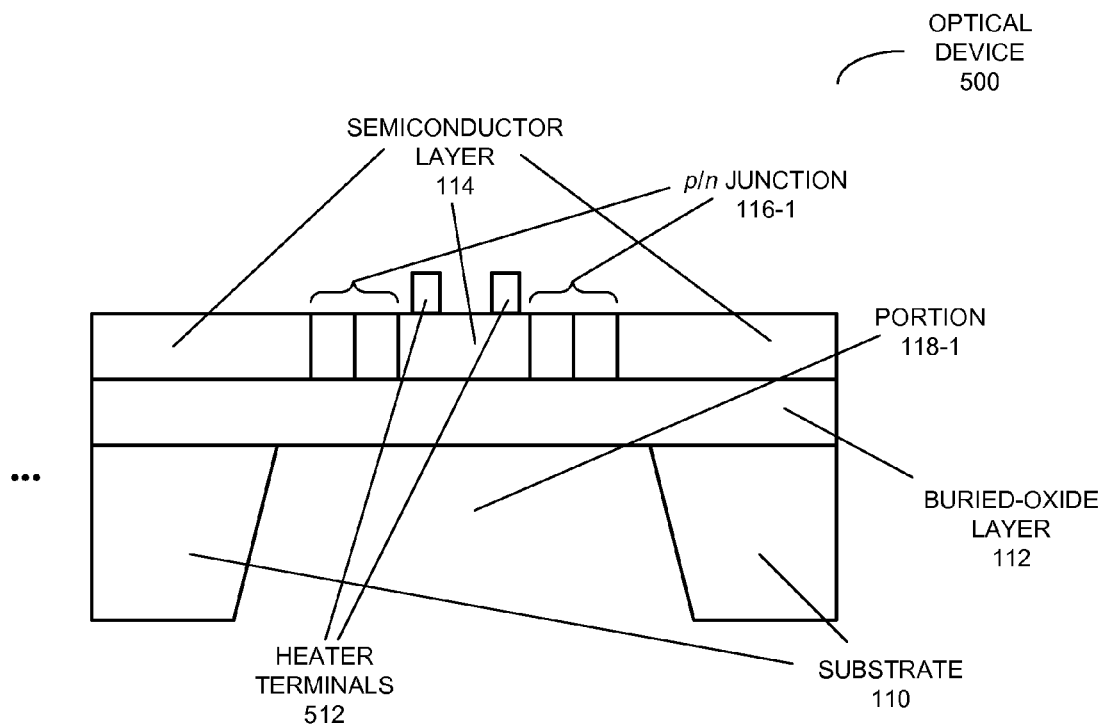
FIG. 5B is a block diagram illustrating a cross-sectional view of the tunable optical device in FIG. 5A in accordance with an embodiment of the present disclosure.

In another type of configuration, the thermal power is delivered to the thermally tunable optical waveguide by passing a DC or AC electrical current from a tuning circuit through the semiconductor layer and a portion of the optical waveguide. As shown in FIGS. 4A and 4B, which present block diagrams illustrating a top view and a cross-sectional view, respectively, of a tunable optical device 400 that includes optical waveguides 410, the electrical current (provided by heater terminals 412) may be approximately in a radial direction (across optical waveguide 410-1). Alternatively, as shown in FIGS. 5A and 5B, which present block diagrams illustrating a top view and a cross-sectional view, respectively, of a tunable optical device 500 that includes optical waveguides 510, the electrical current (provided by heater terminals 512) may be approximately in a circumferential direction (parallel to optical waveguide 510-1).

Note that the heaters in FIGS. 4A-5B may be implemented by doping the silicon in semiconductor layer 114 to $10^{18}/cm^3$. (However, doping the optical waveguide to implement one or more heating elements may increase optical losses due to free-carrier absorption, which can degrade the quality factor of a resonator.) Furthermore, operating bias for optical waveguides 410 (FIG. 4A) and 510, as well as for the heaters in FIGS. 4A-5B, may be provided by highly doped, low-resistance electrical contacts or terminals.

In conjunction with removal of portions 118, either of these heater configurations can be optimized to improve the thermal efficiency of the optical waveguide. This optimization may include modifying the heater geometry and/or scaling down the resonator ring size (for example, the ring size can have a radius as small as 10 μm).

Figure 6:
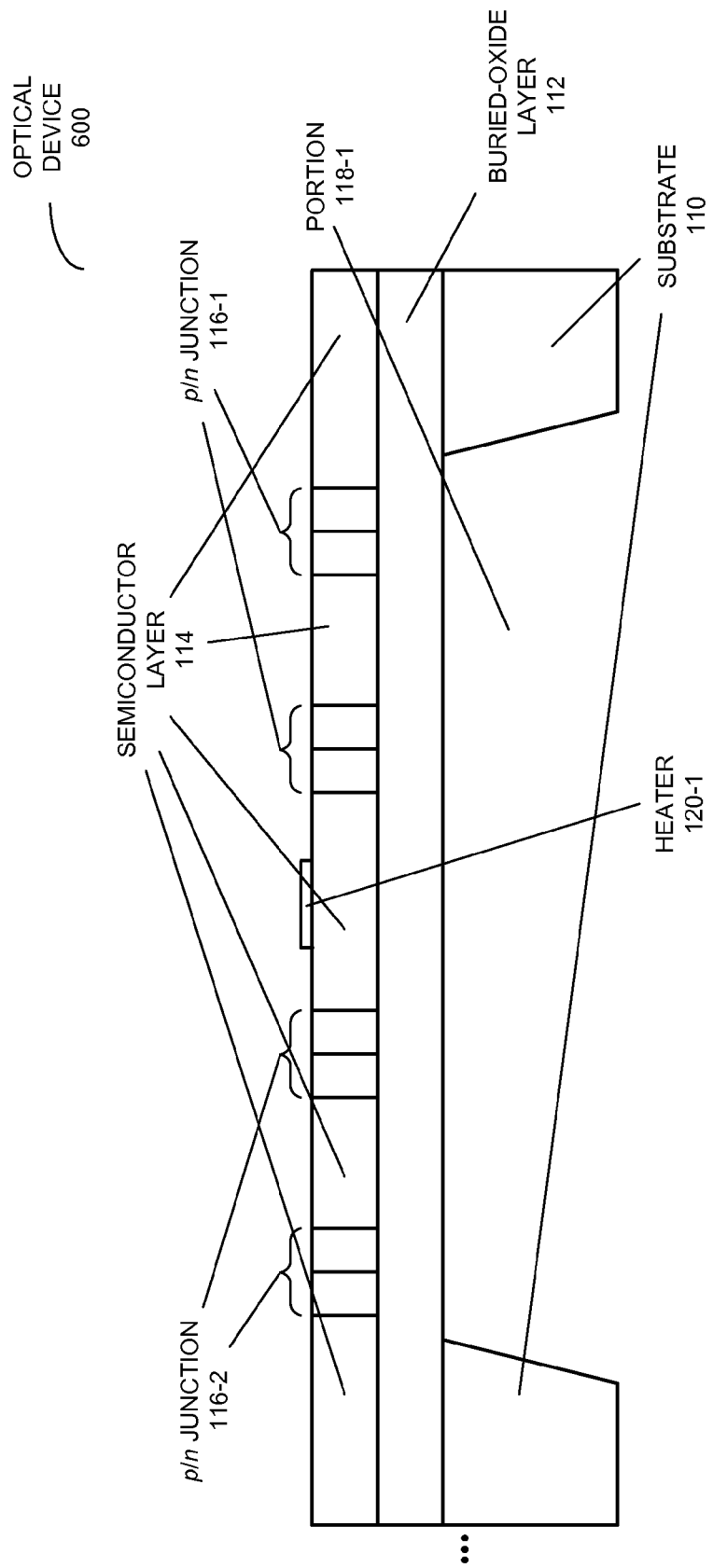
FIG. 6 is a block diagram illustrating a cross-sectional view of a tunable optical device in accordance with an embodiment of the present disclosure.

Note that the optical device may include multiple instances of the thermally tunable optical waveguide in the preceding embodiments. For example, there may be an array of two or more ring optical waveguides implemented in semiconductor layer 114. In some embodiments, these optical waveguides are thermally coupled. For example, as shown in FIG. 6, which presents a block diagram illustrating a cross-sectional view of a tunable optical device 600, semiconductor layer 114 may include a second thermally tunable optical waveguide, and portion 118-1 of substrate 110 may also be substantially beneath a location of a second thermally tunable optical waveguide, so that the two thermally tunable optical waveguides are thermally coupled.

Figure 7:
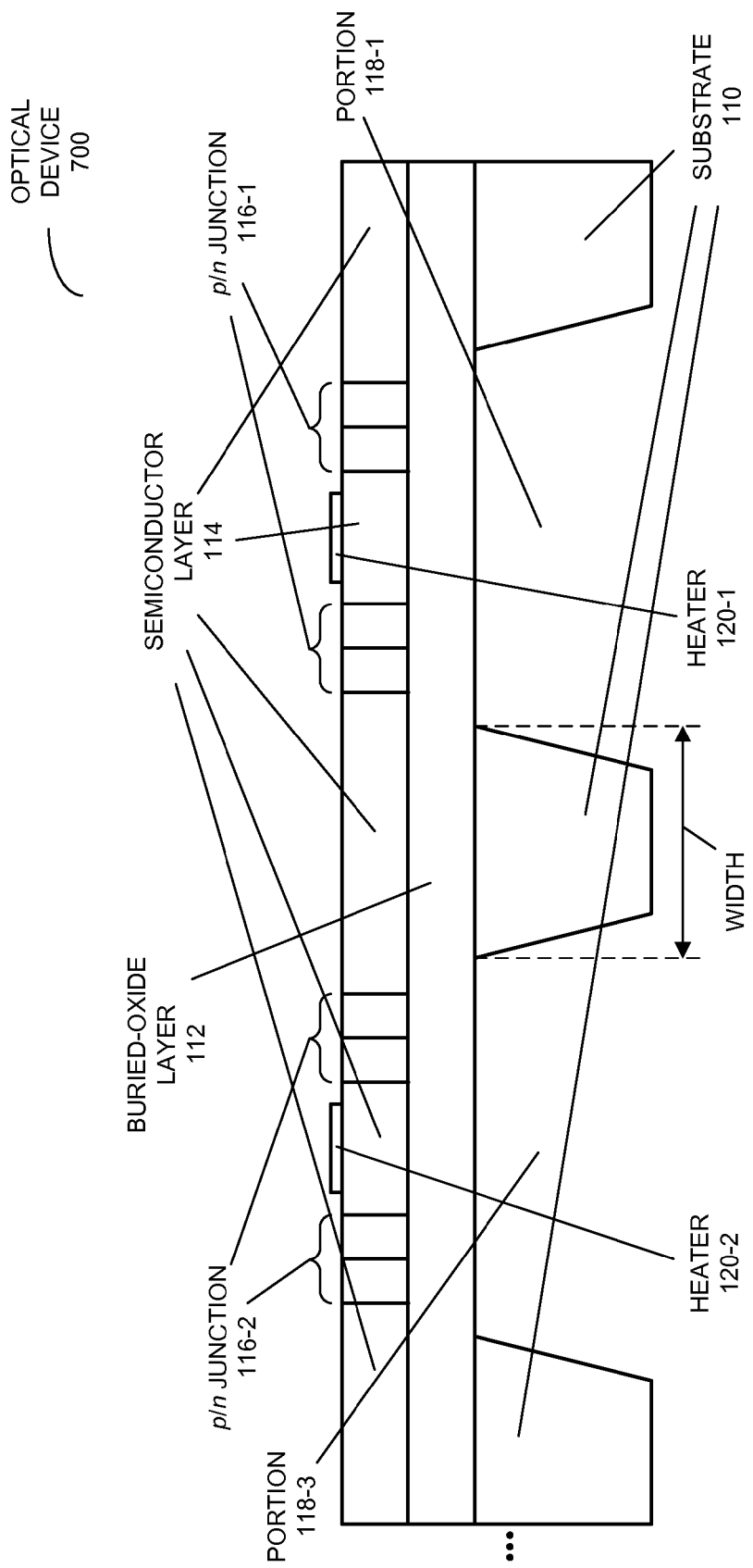
FIG. 7 is a block diagram illustrating a cross-sectional view of a tunable optical device in accordance with an embodiment of the present disclosure.

Alternatively, the thermally tunable optical waveguides may, at least in part, be thermally isolated from each other (i.e., thermally decoupled) by removing different portions of substrate 110. In this way, thermal cross-talk between the neighboring ring optical waveguides may be reduced or eliminated. This configuration is shown in FIG. 7, which presents a block diagram illustrating a cross-sectional view of a tunable optical device 700. In particular, another portion 118-3 of substrate 110 may be removed substantially beneath a location of the second thermally tunable optical waveguide in semiconductor layer 114. Furthermore, portions 118-1 and 118-3 may be separated by a horizontal region in which substrate 110 under buried-oxide layer 112 remains, thereby at least partially thermally isolating the two thermally tunable optical waveguides. Note that a width 710 of the horizontal region may be as large as 10-100 μm.

By reducing or eliminating thermal cross-talk, in this embodiment temperatures of the optical waveguides in the array may be individually programmed, so that one or more optical waveguides can have different temperatures than other optical waveguides in the array. Therefore, in an array of optical waveguides (or more generally, optical components), heaters may be used to produce arbitrary, programmable thermal profiles across the array or to create the necessary tuning, modulation and/or other functionality. Once the heaters are turned on, the power to each may be chosen to increase the temperature of each resonant optical waveguide by the appropriate amount to achieve an operating temperature in the desired range. Note that the temperature control mechanism may include biased temperature control. More generally, the temperature control mechanism may involve a proportional, integrated and/or differential control technique.

In some operating conditions, the absolute wavelength range of the array may experience drift. This can occur if the ambient temperature changes or if there is some global change in the temperature of substrate 110. However, even in this situation, active thermal management of the resonant wavelengths of the optical waveguides will still produce and maintain the correct wavelengths as long as the chip does not experience thermal runaway. This possibility can be substantially mitigated if active cooling is also used to control and maintain the global temperature of substrate 110 at a predetermined level.

In optical devices, such as optical devices 100 (FIG. 1) and 200 (FIG. 2), there are typically three heat dissipation paths between heater 120-1 and the external environment: a first path dissipates heat through buried-oxide layer 112 to substrate 110; a second path dissipates heat through a top layer above semiconductor layer 114 to the air; and a third path dissipates heat through the active semiconductor layer 114. Note that the temperature change in the optical waveguide is proportional to the thermal impedance of all of these heat dissipation paths. Techniques to address the thermal impedance of the first path have already been described in this disclosure, and the thermal impedance of the second path is typically very large. In order to maximize the temperature change in the thermally tunable optical waveguide, the thermal impedance of the third path may also be increased using a variety of materials and/or configurations, which may be used separately and/or in conjunction with each other, as well as with the techniques described previously. For example, a material (such as indium-tin-oxide) in at least a portion of electrodes to heater 120-1 and/or the optical waveguide may have a lower thermal conductivity (i.e., a higher thermal impedance) than a remainder of the electrodes; the electrodes may be electrically coupled to the optical waveguide using interdigited regions of higher and lower electrical conductivity along a length of the optical waveguide; doping profiles may be varied around and/or in the optical waveguide; and/or a geometry of heater 120-1 and the optical waveguide may be used which enhances heat transfer between these components.

By combining some or all of these techniques, the thermal impedance between the optical waveguide in the preceding embodiments of the optical device and the external environment may be increased by over an order of magnitude. This can reduce the power consumed during thermal tuning of the optical waveguide by an order of magnitude. In addition, optical losses in the optical waveguide due to free-carrier absorption can also be reduced by more than 4×. Consequently, these techniques can significantly reduce the power budget for silicon-based optical devices in WDM systems, and in computing systems that include optical interconnects.

Figure 8:
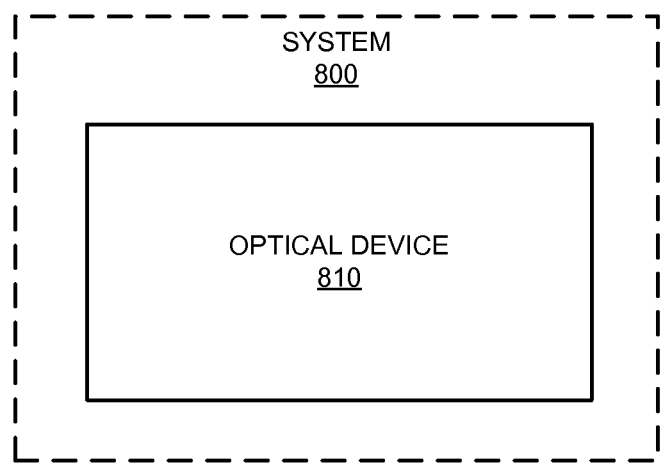
FIG. 8 is a block diagram illustrating a system that includes a thermally tunable optical device in accordance with an embodiment of the present disclosure.

One or more of the preceding embodiments of the optical device may be included in a system and/or an electronic device. This is shown in FIG. 8, which presents a block diagram illustrating a system 800 that includes optical device 810.

In some embodiments, one or more of these optical devices may be included in a multi-chip module (MCM) (such as a switch or a processor) and/or in a system that include the MCM. This MCM may include an array of chip modules (CMs) or single-chip modules (SCMs), and a given SCM may include at least one semiconductor die or substrate. Note that the MCM is sometimes referred to as a 'macro-chip.' Furthermore, the semiconductor die may communicate with other semiconductor dies, CMs, SCMs, and/or devices in the MCM using proximity communication of electromagnetically coupled signals (which is referred to as 'electromagnetic proximity communication'), such as capacitively coupled signals and/or proximity communication of optical signals (which are, respectively, referred to as 'electrical proximity communication' and 'optical proximity communication'). In some embodiments, the electromagnetic proximity communication includes inductively coupled signals and/or conductively coupled signals.

Furthermore, embodiments of the optical device may be used in a variety of applications, including: VLSI circuits, communication systems (such as in wavelength division multiplexing), storage area networks, data centers, networks (such as local area networks), and/or computer systems (such as multiple-core processor computer systems). For example, the optical device may be included in a backplane that is coupled to multiple processor blades, or the optical device may couple different types of components (such as processors, memory, input/output devices, and/or peripheral devices). In some embodiments, the optical device performs the functions of: a switch, a hub, a bridge, and/or a router.

Note that system 800 may include, but is not limited to: a server, a laptop computer, a communication device or system, a personal computer, a work station, a mainframe computer, a blade, an enterprise computer, a data center, a portable-computing device, a supercomputer, a network-attached-storage (NAS) system, a storage-area-network (SAN) system, and/or another electronic computing device. Moreover, note that a given computer system may be at one location or may be distributed over multiple, geographically dispersed locations.

Optical devices in FIGS. 1-7 and/or system 800 in FIG. 8 may include fewer components or additional components. For example, semiconductor layer 114 may include polysilicon or amorphous silicon. Furthermore, one or more embodiments of optical device can also be used if the optical waveguide is electrically tuned (instead of or in addition to thermal tuning) In these embodiments, it is still important that the optical waveguide be thermally isolated from its external environment.

Note that a wide variety of fabrication techniques may be used to fabricate the optical devices in the preceding embodiments, as known to one of skill in the art.

Although these embodiments are illustrated as having a number of discrete items, the embodiments of the optical device and the system are intended to be functional descriptions of the various features that may be present rather than structural schematics of the embodiments described herein. Consequently, in these embodiments two or more components may be combined into a single component, and/or a position of one or more components may be changed.

We now describe embodiments of a process for fabricating an optical device, such as optical device 100 (FIG. 1). FIG. 9 presents a flow chart illustrating a process 900 for fabricating an optical device. During this method, a thermally tunable optical waveguide is defined in a semiconductor layer in at least a tri-layer structure that includes a substrate, a buried-oxide layer disposed on the substrate, and the semiconductor layer disposed on the buried-oxide layer (operation 910). Then, a portion of the substrate under the buried-oxide layer and substantially beneath a location of the thermally tunable optical waveguide is removed so that a portion of the buried-oxide layer is exposed (operation 912), thereby increasing a thermal impedance between the thermally tunable optical waveguide and an external environment, and reducing power consumption associated with thermal tuning of the optical waveguide.

In some embodiments of process 900, there may be additional or fewer operations. Moreover, the order of the operations may be changed, and/or two or more operations may be combined into a single operation. For example, the portion of the substrate may be removed before the optical waveguide is defined in the semiconductor layer.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An optical device, comprising:
a substrate;
a continuous buried-oxide layer disposed on the substrate;
a semiconductor layer, disposed on the buried-oxide layer, that includes a thermally tunable optical waveguide;
wherein a portion of the substrate under the buried-oxide layer and substantially beneath a location of the thermally tunable optical waveguide is fabricated so that a portion of the buried-oxide layer is exposed, wherein the portion of the buried-oxide layer that is exposed is coupled to the substrate and the optical waveguide, and wherein at least a portion of the optical waveguide sits on the portion of the buried-oxide layer that is exposed; and
a gap in the substrate corresponding to the portion of the substrate;
wherein fabricating the portion of the substrate so that a portion of the buried-oxide layer is exposed comprises creating the gap in the substrate by removing the portion of the substrate,
wherein the gap in the substrate defines at least two support structures comprising the substrate, wherein the support structures are on opposites sides of the gap,
wherein the buried-oxide layer comprises a continuous layer that stretches over the at least two support structures and all of the gap without any breaks in the continuous layer, and
wherein the semiconductor layer comprises a continuous layer that stretches over the at least two support structures and all of the gap without any breaks in the continuous layer.

2. The optical device of claim 1, wherein the substrate includes silicon.

3. The optical device of claim 1, wherein the buried-oxide layer includes a silicon oxide.

4. The optical device of claim 1, wherein the oxide includes a dielectric.

5. The optical device of claim 1, wherein the portion of the substrate is removed using an etch technique in which the buried-oxide layer functions as an etch stop.

6. The optical device of claim 1, wherein the semiconductor layer includes silicon.

7. The optical device of claim 1, wherein the substrate, the buried-oxide layer and the semiconductor layer comprise a silicon-on-insulator technology.

8. The optical device of claim 1, further comprising a heater, defined on or near the semiconductor layer, which is in or proximate to the optical waveguide, and which is used to thermally tune the optical waveguide.

9. The optical device of claim 8, wherein the heater includes one or more of a passive resistor and an active device.

10. The optical device of claim 1, wherein the optical waveguide is included in one of: an optical modulator, an optical filter, an optical multiplexer, an optical de-multiplexer and an add/drop device.

11. The optical device of claim 1, wherein the semiconductor layer includes a second thermally tunable optical waveguide;
wherein a second portion of the substrate under the buried-oxide layer and substantially beneath a location of the second thermally tunable optical waveguide is fabricated so that a second portion of the buried-oxide layer is exposed; and
wherein the first portion of the substrate and the second portion of the substrate are separated by a horizontal region in which the substrate under the buried-oxide layer remains, thereby, at least in part, thermally isolating the thermally tunable optical waveguide from the second thermally tunable optical waveguide.

12. The optical device of claim 1, wherein the semiconductor layer includes a second thermally tunable optical waveguide; and
wherein the portion of the substrate under the buried-oxide layer is also substantially beneath a location of the second thermally tunable optical waveguide.

13. A system, comprising a component that includes an optical device, the optical device comprising:
a substrate;
a continuous buried-oxide layer disposed on the substrate;
a semiconductor layer, disposed on the buried-oxide layer, that includes a thermally tunable optical waveguide;
wherein a portion of the substrate under the buried-oxide layer and substantially beneath a location of the thermally tunable optical waveguide is fabricated so that a portion of the buried-oxide layer is exposed, wherein the portion of the buried-oxide layer that is exposed is coupled to the substrate and the optical waveguide, and wherein at least a portion of the optical waveguide sits on the portion of the buried-oxide layer that is exposed; and a gap in the substrate corresponding to the portion of the substrate;

wherein fabricating the portion of the substrate so that a portion of the buried-oxide layer is exposed comprises creating the gap in the substrate by removing the portion of the substrate, wherein the gap in the substrate defines at least two support structures comprising the substrate, wherein the support structures are on opposites sides of the gap, wherein the buried-oxide layer comprises a continuous layer that stretches over the at least two support structures and all of the gap without any breaks in the continuous layer, and wherein the semiconductor layer comprises a continuous layer that stretches over the at least two support structures and all of the gap without any breaks in the continuous layer.

14. The system of claim 13, wherein the substrate includes silicon.

15. The system of claim 13, wherein the optical device further comprises a heater, defined on or near the semiconductor layer, which is in or proximate to the optical waveguide, and which is used to thermally tune the optical waveguide.

16. The system of claim 13, wherein the semiconductor layer includes a second thermally tunable optical waveguide;

wherein a second portion of the substrate under the buried-oxide layer and substantially beneath a location of the second thermally tunable optical waveguide is fabricated so that a second portion of the buried-oxide layer is exposed; and wherein the first portion of the substrate and the second portion of the substrate are separated by a horizontal region in which the substrate under the buried-oxide layer remains, thereby, at least in part, thermally isolating the thermally tunable optical waveguide from the second thermally tunable optical waveguide.

17. The system of claim 13, wherein the semiconductor layer includes a second thermally tunable optical waveguide; and wherein the portion of the substrate under the buried-oxide layer is also substantially beneath a location of the second thermally tunable optical waveguide.

18. A method for fabricating an optical device, comprising:

defining a thermally tunable optical waveguide in a semiconductor layer in at least a tri-layer structure that includes a substrate, a continuous buried-oxide layer disposed on the substrate, and the semiconductor layer disposed on the buried-oxide layer; and removing a portion of the substrate under the buried-oxide layer and substantially beneath a location of the thermally tunable optical waveguide so that a portion of the buried-oxide layer is exposed, wherein the portion of the buried-oxide layer that is exposed is coupled to the substrate and the semiconductor layers, wherein at least a portion of the optical waveguide sits on the portion of the buried-oxide layer that is exposed, wherein removing the portion of the substrate so that the portion of the buried-oxide layer is exposed comprises creating a gap in the substrate, wherein the gap in the substrate defines at least two support structures comprising the substrate, wherein the support structures are on opposites sides of the gap, wherein the buried-oxide layer comprises a continuous layer that stretches over the at least two support structures and all of the gap without any breaks in the continuous layer, and wherein the semiconductor layer comprises a continuous layer that stretches over the at least two support structures and all of the gap without any breaks in the continuous layer.

\* \* \* \* \*

UNITED STATES PATENT AND TRADEMARK OFFICE
CERTIFICATE OF CORRECTION

PATENT NO.        : 8,971,674 B2
APPLICATION NO.   : 12/730774
DATED             : March 3, 2015
INVENTOR(S)       : Shubin et al.

It is certified that error appears in the above-identified patent and that said Letters Patent is hereby corrected as shown below:

In the specification

In column 7, line 59, delete "interdigited" and insert -- interdigitated --, therefor.

In column 8, line 59, delete "tuning)" and insert -- tuning). --, therefor.

Signed and Sealed this
Thirteenth Day of October, 2015

Michelle K. Lee
*Director of the United States Patent and Trademark Office*